Feb. 21, 1939.  G. W. GRIST  2,148,119
DEVICE FOR OBTAINING OBJECTIVE EVIDENCE FROM A MOVING VEHICLE
Filed Sept. 13, 1937
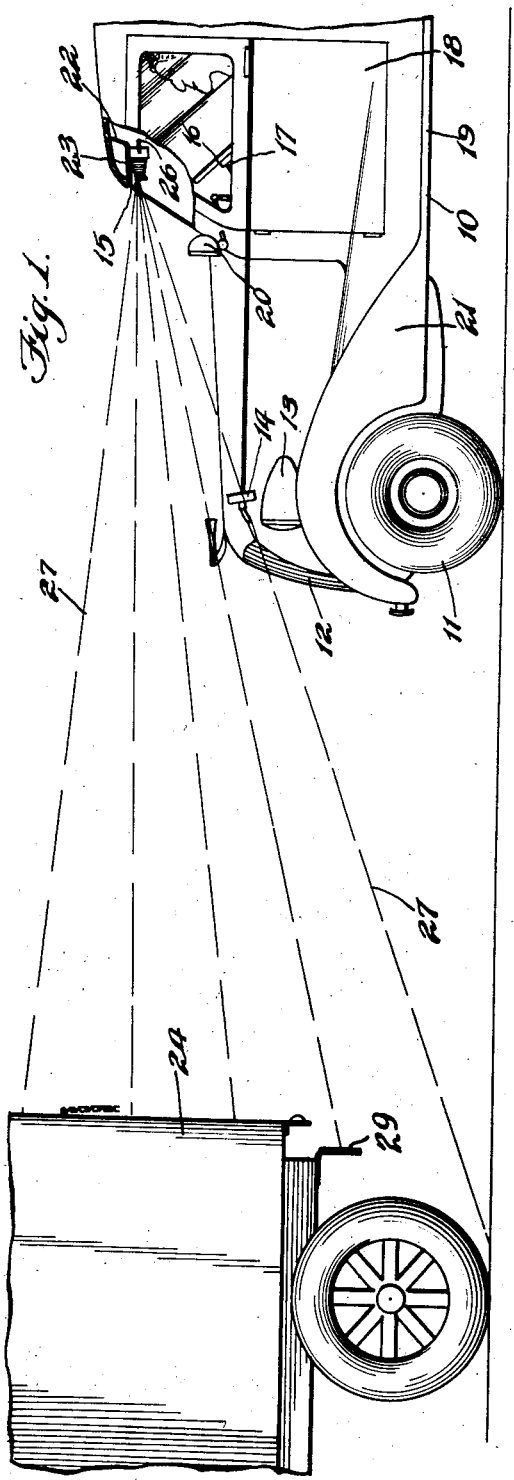
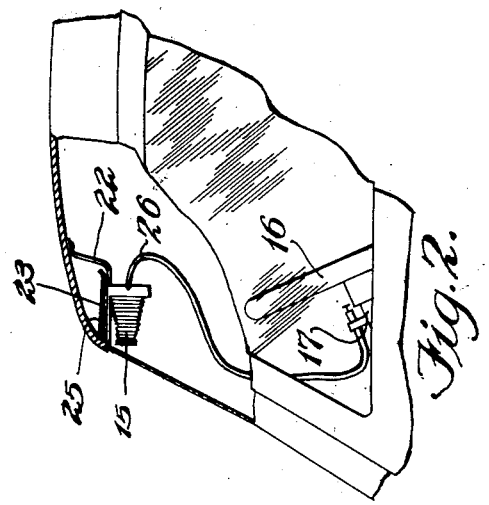
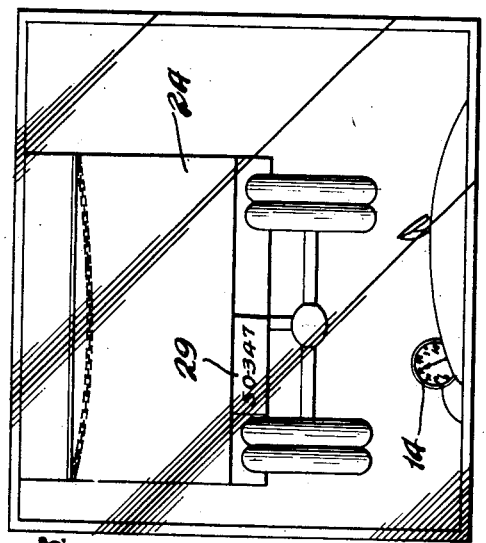
Inventor.
George W. Grist
By John B. Hosty
Atty.

Patented Feb. 21, 1939

2,148,119

UNITED STATES PATENT OFFICE 2,148,119

DEVICE FOR OBTAINING OBJECTIVE EVIDENCE FROM A MOVING VEHICLE

George W. Grist, Chicago, Ill.

Application September 13, 1937, Serial No. 163,515

1 Claim. (Cl. 95—1.1)

The object of my invention is the provision of new and novel means for photographically recording the approximate speed of a moving vehicle; the photograph being taken from another moving vehicle equipped with the combination of elements constituting the device of the invention; the product of the combination distinctly identifying the trailed vehicle and disclosing the approximate speed of travel at the time of exposure.

Most automotive safety engineers are agreed that excessive speed is an important factor in the appalling loss of life and limb incident to the operation of self-propelled road vehicles under modern conditions. Their conclusions have found expression in the various regulatory laws imposing speed limits upon the operators of automobiles, trucks, and similar self-propelled vehicles. The enforcement of these salutary laws is fraught with grave difficulties due to the subjective factors involved. In many traffic courts, with uniform monotony the alleged violator will deny he was travelling at the rate of speed charged by the arresting officer. The prompt and orderly administration of justice is seriously impaired by controversy on this point—frequently constituting the main point at issue—and regardless of the finding of the court either the citizen or the arresting officer may feel aggrieved. The net result being in many cases loss of morale on the part of the law enforcing agency of government; disrespect for courts and legal process on the part of the citizen, and a tremendous waste of time, with no diminution of traffic violation on the part of the citizenry at large.

With the above in view, a further object of my invention is to place the enforcement of speed laws on a scientific basis, so that the truth or falsity of the evidence adduced in support of the alleged violation may depend not so much on fallible memory, prejudice or subjective feelings, but to at least some extent upon objective evidence. To accomplish this end my inventive concept embraces the provision of a conventional speedometer externally mounted on the car of the law enforcing officer in such a manner as to permit of a picture being taken from the inside of the car. This picture, or product of my invention, when properly taken will disclose the readings on the external speedometer, and also an easily identifiable portion of the moving vehicle of the alleged traffic violator. Obviously, for the accurate recording of the speed of the trailed vehicle, it is necessary that the trailing vehicle be travelling at the same speed. However, traffic officers are required to thus pace a car before making an arrest so it is while this is being done that the picture is taken. There is then no question as to the speed of the trailing vehicle or the identity of the trailed vehicle. The only question being as to the relative speed of the two vehicles—which question can be established by testimony. It is obvious that other violations than those of excessive speed in progress at the time of exposure will be recorded.

Other objects and advantages reside in the structural features of the invention, combination and arrangement of the several parts and in the particular mode of operation—all of which will be readily apparent upon reference to the drawing and the following detailed description forming a part of the specification.

In describing one form of my invention in detail, reference will be had to the accompanying drawing wherein like characters of reference denote like or corresponding parts throughout the several views and in which:

Fig. 1 is a side elevation partially in cross section of a car equipped with my invention trailing a truck;

Fig. 2 is an enlarged fragmentary view of a portion of Figure 1 showing the camera mounting, and Fig. 3 is a view of the picture obtained from Figure 1, disclosing that the trailed unit was moving at the rate of about 30 miles per hour.

With particular attention to Fig. 1, the reference number 10 indicates generally the front portion of a conventional car equipped with my invention; numerals 11, 12 and 13 indicate respectively the front wheel, front headlight and radiator grille. 14 is the dial of the external speedometer positioned over headlight 13, more clearly shown in Fig. 3. The front portion of the car may be recessed for the reception of the dial, so as to avoid subjecting the same to unnecessary exposure. By means of a conventional adapter, the external dial is driven from the same source of power as the standard dial on the instrument panel of the car, so that both speedometers may be constantly checked with each other.

Reference numeral 15 indicates the camera, which may be of standard type, fixedly secured on sun visor 25, so as to permit of relative movement in association with the latter element. The shutter-operating cable 26 may be disposed in any convenient manner for facile manual operation; in the present instance I prefer to have the terminus adjacent steering column 17, and below steering wheel 16. The camera is securely mounted against unavoidable road shocks, by means of bracket and flat spring, 22 and 23 or in any other convenient manner. Additional illumination, as indicated by side light 20 will be found desirable at night time, or under inclement weather conditions.

The reference numerals 18, 19 and 21 indicate respectively the left-front door, running board and front fender of a standard automobile. 24 is the rear portion of the trailed truck disclosing the license plate, and 27 the visual light rays showing the camera is focused on the rear portion of truck 24.

The manner of operation is self-evident. The camera has a constant focus to which the operator readily adapts himself. When the camera and the trailed unit are in substantial alignment and both travelling at substantially the same rate of speed, the operator releases the shutter so that the exposure reveals the intervening external speedometer, and an identifiable portion of the trailed unit, usually the license tag 29. The picture thus taken thereby clearly discloses the approximate rate of speed at which the trailed unit was travelling at the time of exposure, and shows also any other traffic violations in progress at that time.

From the foregoing detailed description of a preferred embodiment of my invention, it is obvious that various modifications may be made in the details of construction and mountings without departing from the spirit and scope of my invention. It is obvious that the camera might be mounted in a different manner and in a different position of the automobile, and that the external speedometer might be variously mounted. My invention resides in the combination of the camera and the external speedometer, however mounted, arranged or displayed for the purpose of interposing the latter element between the camera and the trailed unit.

Having clearly described my invention and the manner of operation, what I claim is:

In combination with a vehicle having a transparent windshield, means mounting a rearwardly facing visual speed indicator closely adjacent the front end of said vehicle, means mounting a forwardly facing camera behind said windshield and adjacent the top thereof, said camera being aligned with a central portion of said vehicle and being mounted above the plane of said indicator and being downwardly inclined slightly, said camera having a constant focus of sufficient depth to permit the reading of said indicator, a portion of the roadway immediately ahead of said vehicle and at least an identifiable portion of any vehicle immediately ahead of said first vehicle on said portion of said roadway to be photographed simultaneously by a single exposure of said camera, and said indicator being positioned on said first vehicle in alignment with a side portion thereof to permit said camera to have a clear view of substantially all of said portion of said roadway, and operating means for said camera adjacent the steering wheel of said first vehicle.

GEORGE W. GRIST.